US012220365B2

(12) United States Patent
Gamburd et al.

(10) Patent No.: US 12,220,365 B2
(45) Date of Patent: Feb. 11, 2025

(54) BATHTUB CHAIR

(71) Applicant: SolutionBased Inc., Pacoima, CA (US)

(72) Inventors: Israel Gamburd, Pacoima, CA (US); Sam Sundarraj, Wellington (NZ)

(73) Assignee: SolutionBased Inc., Pacoima, CA (US)

(*) Notice: Subject to any disclaimer, the term of this patent is extended or adjusted under 35 U.S.C. 154(b) by 192 days.

(21) Appl. No.: 18/098,709

(22) Filed: Jan. 19, 2023

(65) Prior Publication Data

US 2024/0245564 A1 Jul. 25, 2024

(51) Int. Cl.
*A61G 7/10* (2006.01)
*A61G 7/02* (2006.01)

(52) U.S. Cl.
CPC ............. *A61G 7/1003* (2013.01); *A61G 7/02* (2013.01); *A61G 7/1034* (2013.01); *A61G 7/1059* (2013.01)

(58) Field of Classification Search
CPC ...... A61G 7/02; A61G 7/1034; A61G 7/1059; A61G 7/1003
USPC ........................ 4/578.1, 573.1, 590, 579, 583
See application file for complete search history.

(56) References Cited

U.S. PATENT DOCUMENTS 4,091,479 A * 5/1978 Hancock .............. A61G 7/1034 4/560.1
4,141,094 A * 2/1979 Ferguson ............. A61G 5/1054 297/DIG. 10
4,520,515 A * 6/1985 Hatala .................. A61G 7/1092 297/440.22
4,606,082 A * 8/1986 Kuhlman ................. A61G 5/00 4/561.1
5,335,377 A * 8/1994 Masyada ................ A47K 3/122 4/578.1
5,377,366 A * 1/1995 Boyd ..................... A47K 3/122 4/561.1
5,740,563 A * 4/1998 Gaddy ................... A47K 3/122 297/344.21
5,784,728 A * 7/1998 Weddendorf .......... A47K 3/122 4/579
(Continued)

FOREIGN PATENT DOCUMENTS

CA 2261439 C * 1/2001 ............. A47K 3/122
CA 2969015 A1 * 12/2018 ............. A61G 7/053
(Continued)

*Primary Examiner* — Lori L Baker
(74) *Attorney, Agent, or Firm* — Nolan Heimann LLP; Adam Diament

(57) ABSTRACT

A bathtub chair for transferring a user between a bathtub and/or toilet. The bathtub chair includes rail frames and leg frames. The leg frames include first connecting members connecting the rail frames. The leg frames have a height adjusting mechanism. The bathtub chair includes a seat assembly connected to the rail frames. The seat assembly includes a seat. The seat receives the user and is capable of swivelling. Further, the seat assembly slides along the rail frames. The seat assembly includes side latches. One of the side latches connects to the first connecting members when the seat assembly slides towards a leg frame of the leg frames. The bathtub chair further includes a handlebar having second connecting members. The handlebar mounts to the rail frames in between a leg frame and one distal end of the rail frames.

20 Claims, 12 Drawing Sheets

(56) References Cited

U.S. PATENT DOCUMENTS

| | | | | | |
|---|---|---|---|---|---|
| 5,822,809 | A * | 10/1998 | Gallo | A47K 3/122 4/578.1 |
| 5,937,454 | A * | 8/1999 | Drew | A61G 7/1003 4/565.1 |
| 5,988,737 | A * | 11/1999 | Tomaiuolo | A47C 4/52 297/183.5 |
| 6,035,459 | A * | 3/2000 | Sadek | A47K 3/122 4/560.1 |
| 6,039,403 | A * | 3/2000 | Hargroder | A47K 3/122 297/440.16 |
| 6,088,847 | A * | 7/2000 | Burrow | A47K 3/122 4/578.1 |
| 6,240,577 | B1 * | 6/2001 | Worthy | A47K 3/122 4/578.1 |
| 6,334,225 | B1 * | 1/2002 | Brinkmann | A61G 7/1067 4/578.1 |
| 6,681,415 | B1 * | 1/2004 | Gallo | A47K 3/122 4/578.1 |
| 6,804,842 | B1 * | 10/2004 | Johnson | A47K 3/122 4/578.1 |
| 7,661,154 | B2 * | 2/2010 | Cheng | A47K 3/122 4/578.1 |
| 7,690,055 | B2 * | 4/2010 | Hammer | A61G 7/1003 4/560.1 |
| 8,307,471 | B2 * | 11/2012 | Seymour | A61G 7/1076 4/578.1 |
| 8,332,971 | B2 * | 12/2012 | Bennett | A47K 3/122 4/578.1 |
| 8,677,520 | B2 * | 3/2014 | Storm | A61G 5/1002 4/578.1 |
| 9,468,573 | B2 * | 10/2016 | Edwards | A61G 7/1059 |
| 10,368,699 | B2 * | 8/2019 | Hart | A47K 3/122 |
| 10,575,687 | B1 * | 3/2020 | Ehrenberg | A61G 5/022 |
| 10,595,684 | B2 * | 3/2020 | McCaffery | A47K 3/062 |
| 10,610,433 | B2 * | 4/2020 | Kelsey | A47K 3/122 |
| 10,694,897 | B2 * | 6/2020 | Hart | A47K 3/122 |
| 10,702,064 | B1 * | 7/2020 | Beattie | F16M 13/00 |
| 10,736,470 | B2 * | 8/2020 | Preece | A47C 13/005 |
| 10,893,991 | B1 * | 1/2021 | Lara | A47C 7/5064 |
| 10,939,785 | B2 * | 3/2021 | Hart | A61G 7/1084 |
| 11,083,343 | B2 * | 8/2021 | Lee | A47K 3/286 |
| 2005/0076431 | A1 * | 4/2005 | Reynolds | A47K 3/122 4/579 |
| 2006/0236449 | A1 * | 10/2006 | Hammer | A61G 7/1003 4/560.1 |
| 2006/0272085 | A1 * | 12/2006 | Hribsek | A47K 3/122 4/579 |
| 2008/0034494 | A1 * | 2/2008 | Monteiro | A47K 3/122 4/560.1 |
| 2008/0052814 | A1 * | 3/2008 | Kaiwai | A61G 7/1059 4/480 |
| 2011/0056013 | A1 * | 3/2011 | Seymour | A47K 3/006 4/560.1 |
| 2011/0131720 | A1 * | 6/2011 | Dean | A61G 7/1076 4/564.1 |
| 2011/0283449 | A1 * | 11/2011 | Baxley | A61G 7/1003 4/560.1 |
| 2012/0030870 | A1 * | 2/2012 | Storm | A61G 5/1002 280/47.38 |
| 2013/0313864 | A1 * | 11/2013 | Lau | A47C 7/407 297/16.1 |
| 2014/0230139 | A1 * | 8/2014 | Jin | A47K 3/022 4/578.1 |
| 2018/0311098 | A1 * | 11/2018 | Kelsey | A61G 7/1003 |
| 2021/0069042 | A1 * | 3/2021 | Devandry | A61G 7/1092 |
| 2021/0330529 | A1 * | 10/2021 | Smith | A61G 7/1003 |
| 2022/0192907 | A1 * | 6/2022 | Pang | A61G 7/1003 |

FOREIGN PATENT DOCUMENTS

| | | | | |
|---|---|---|---|---|
| CN | 107106391 | A * | 8/2017 | A47K 3/001 |
| DE | 102009024478 | A1 * | 1/2011 | A61G 5/1059 |
| DE | 202018106367 | U1 * | 3/2020 | A61G 7/053 |
| GB | 2113086 | A * | 8/1983 | A61G 5/00 |
| JP | 2001238930 | A * | 9/2001 | A61G 7/053 |
| WO | WO-0205696 | A2 * | 1/2002 | A47K 3/122 |
| WO | WO-2011100556 | A2 * | 8/2011 | A61G 5/006 |
| WO | WO-2017106653 | A1 * | 6/2017 | A47K 3/12 |
| WO | WO-2018096479 | A1 * | 5/2018 | A61G 7/053 |

* cited by examiner

BATHTUB CHAIR

CROSS-REFERENCE TO RELATED APPLICATIONS

None.

FIELD OF THE DISCLOSURE

The present invention relates to a chair, and more specifically, to an adjustable chair to fit in a bathtub.

BACKGROUND OF THE INVENTION

Seniors or people with disabilities have trouble getting into a shower or tub. Typically, the seniors or people with disabilities need help from a caretaker to enter or exit the shower or tub area. In order to help the seniors or people with disabilities to get into and out of the shower or tub, transfer devices have been disclosed in the past. One such device is disclosed in a United States Publication No. 20220192907, entitled “Safety system for a bathroom facility transfer system” (“the ’907 Publication”). The ’907 Publication discloses a bathroom facility transfer system, including a mobile base, a stationary base, and a removable bridge. A user seated in a chair, is positioned adjacent to a bathroom facility with the mobile base. The removable bridge connects the mobile base to the stationary base, which is removably affixed to the bathroom facility, to allow the chair carrying the user to be moved between the mobile base and the stationary base. A chair blocking member on the removable base is movable between a) a chair blocking position, and b) a chair unblocking position. At least one opposed end of the chair blocking member interferes with movement of the chair onto the removable bridge from the mobile base or the stationary base, when the chair blocking member is in the chair blocking position. A method of assisting a user with accessing a bathroom facility is also disclosed.

Another device is disclosed in a U.S. Pat. No. 7,661,154, entitled “Bathing chair with turnable seat” (“the ’154 Patent”). The ’154 Patent discloses a bathing chair with a fixing device comprises a front frame and a rear frame, shaped like the inverted letter U, reaching across a bathtub and having horizontal rods which pass over an edge of the bathtub at a distance, the front and rear frames being connected by right and left connecting rods, a seat, having a fixed base mounted on the horizontal rods, an axis mounted on the fixed base in a central position thereof, and a rotatable base, which is rotatable around the axis, a bearing assembly, comprising several gliding blocks connected with the seat and allowing the seat to glide along the horizontal rods, and a handle.

Yet another device is disclosed in a U.S. Pat. No. 7,690,055, entitled “Bath transfer system” (“the ’055 Patent”). The ’055 Patent discloses a new and improved stable and portable bath transfer system that provides a disabled person complete access to bathroom facilities without having to transfer apparatus. The invention comprises a chair portion, a connector bridge portion, and a bathtub portion. The chair portion includes a base section with two or more support members and an upper chassis section including an adjustable backrest, a collapsible chair seat, and two swing-away armrests. The connector bridge portion includes connecting members attached by a cross member. The bathtub portion includes a base and four adjustable support members that provide increased stability and fine adjustment capability to match the chair portion height. The bath transfer system includes an interlocking system containing a continuous groove and lipped brackets to prevent the upper chassis section from tipping or lifting, and anti-roll mechanisms and a volitional latch to prevent undesired sliding of the upper chassis.

Although the above discussed devices are useful, they have a few limitations. For example, most of the devices known in the art are expensive, and lower cost versions do not work well. Further, the devices known in the art are difficult to use by the people with disabilities to sit down in a direction that faces either the front or rear of the tub.

Therefore, there remains a continuing need for improved chairs to be used inside of bathtubs.

BRIEF SUMMARY OF THE PRESENT INVENTION

The present invention provides a bathtub chair for transferring a user between a bathtub and/or toilet. The bathtub chair includes rail frames, and leg frames having first connecting members. The first connecting members connect the rail frames. The bathtub chair includes a seat assembly connected to the rail frames. The seat assembly includes a seat. The seat is capable of receiving a user. The seat is designed to swivel, and the seat assembly is design to slide along the rail fames. The seat receives the user and swivels. The seat assembly slides along the rail frames.

In one aspect of the present invention, the seat assembly includes a swivel plate. The swivel plate includes latch holes. The seat assembly further includes a roller support ring having swivel rollers. The swivel rollers rotate and allow the swivel plate to swivel along with the seat. Further, the seat assembly includes a latch pin. The latch pin enters one of the latch holes and locks the rotation/direction of the seat. Furthermore, the seat assembly includes a lever. The lever connects and engages the latch pin to enter or pull out from one of the latch holes.

In another aspect of the present invention, each of the leg frames includes a first leg part and a second leg part. The first leg part includes a pin. The second leg part includes a plurality of holes. The pin enters one of the plurality of holes and helps to adjust the height of a leg frame of the leg frames.

Further, each of the first connecting members includes a first T-shaped member and a second T-shaped member. Each of the first T-shaped member and the second T-shaped member comprises a plurality of connecting pads. The connecting pads connect around a rail frame of the rail frames to connect the leg frame with the rail frame. Further, the rail frame includes a leg and handle receiving section extending along the entire length, or substantially the entire length (e.g. 70%, 80%, 90%, or 100% and all in between values) of the rail frame. The connecting pads insert in the leg and handle receiving section.

In another aspect of the present invention, the bathtub chair includes a handlebar. The handlebar includes a second connecting member having connecting pads. The connecting pads connect around a rail frame of the rail frames. The handlebar mounts to the rail frames in between a leg frame and one distal end of the rail frames.

Further, the bathtub chair includes side latches. One of the side latches connects to a connecting pad of the connecting pads when the seat assembly slides towards a leg frame of the leg frames.

In one advantageous feature of the present invention, the bathtub chair combines both the swivel function and the toileting hole (seat opening provided at the seat). The bathtub chair uses a unique swivel plate and roller support ring design with no central axle point, allowing for a large toilet hole in a swivel seat. The presently disclosed bathtub chair achieves this using the roller support ring having swivel rollers. The swivel rollers rotate and allow the swivel plate to swivel along with the seat. The swivel seat allows the user to sit on the seat in a direction that faces either the front or rear of the bathtub and rotate sideways depending on the need.

In another advantageous feature of the present invention, the bathtub chair presents a unique latching mechanism implemented by the latch pin. The latch pin is pushed or pulled for locking or unlocking the latch plate using the lever. This allows the seat to be swivelled and locked once desired direction of the seat is achieved.

In yet another advantageous feature of the present invention, the bathtub chair provides a unique mounting system that allows the leg frames to be clamped at any appropriate position along the rail frames. This allows the user to precisely position the leg frames where he/she needs them to suit the bathroom. The leg frames are spaced far enough away from the end so that the user won't slide too far in and pinch himself/herself against the end of the bathtub chair. The user can unlock the side latches from the first connecting members by pushing against it. The leg frames also act as a stopper for the seat assembly when the side latches get locked to the connecting pads at the leg frames.

DETAILED DESCRIPTION OF EMBODIMENTS

Figure 1:
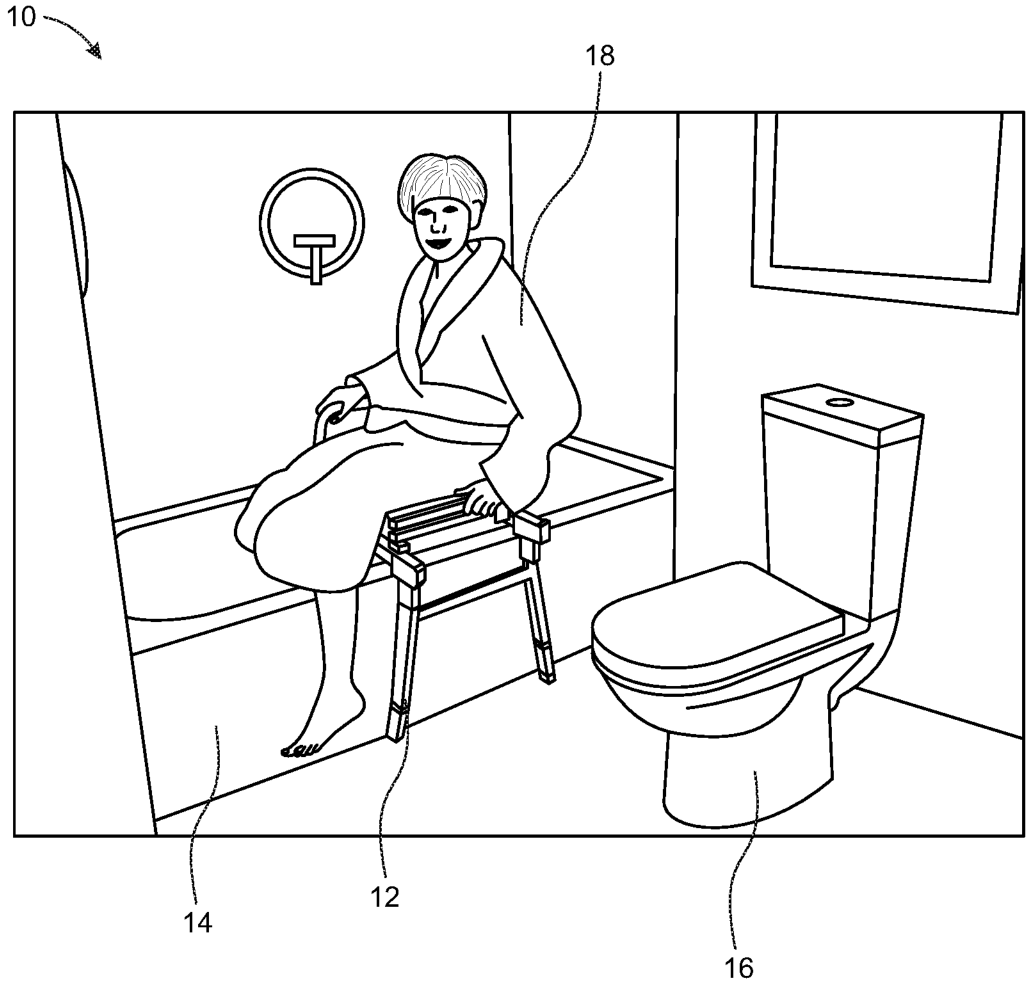
FIG. 1 illustrates an environment in which a bathtub chair implements, in accordance with one embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

The term "designed to" means that a particular element has structures that enable (i.e. capable of) a movement. Likewise, the term "designed to" may also mean "adapted to" or "configured to."

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, +10%, +25%, +50%, +75%, +100%, +200%, +500%, or other ranges that do not detract from the spirit of the invention. The terms about, approximately, or substantially may include values known to those having ordinary skill in the art. If not known in the art, these terms may be considered to be in the range of up to +5%, +10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Turning to the Figures, FIG. 1 is an environment 10 in which a bathtub chair 12 implements, in accordance with one exemplary embodiment of the present invention. Bathtub chair 12 presents use in a bathtub 14 and/or toilet 16 for a user 18. Bathtub chair 12 rests over the ground and allows user 18 to slide into and away from bathtub 14 making it easier for user 18 to sit on bathtub chair 12 and move/slide over bathtub 14 without slipping on the wet floor.

Figure 2A:
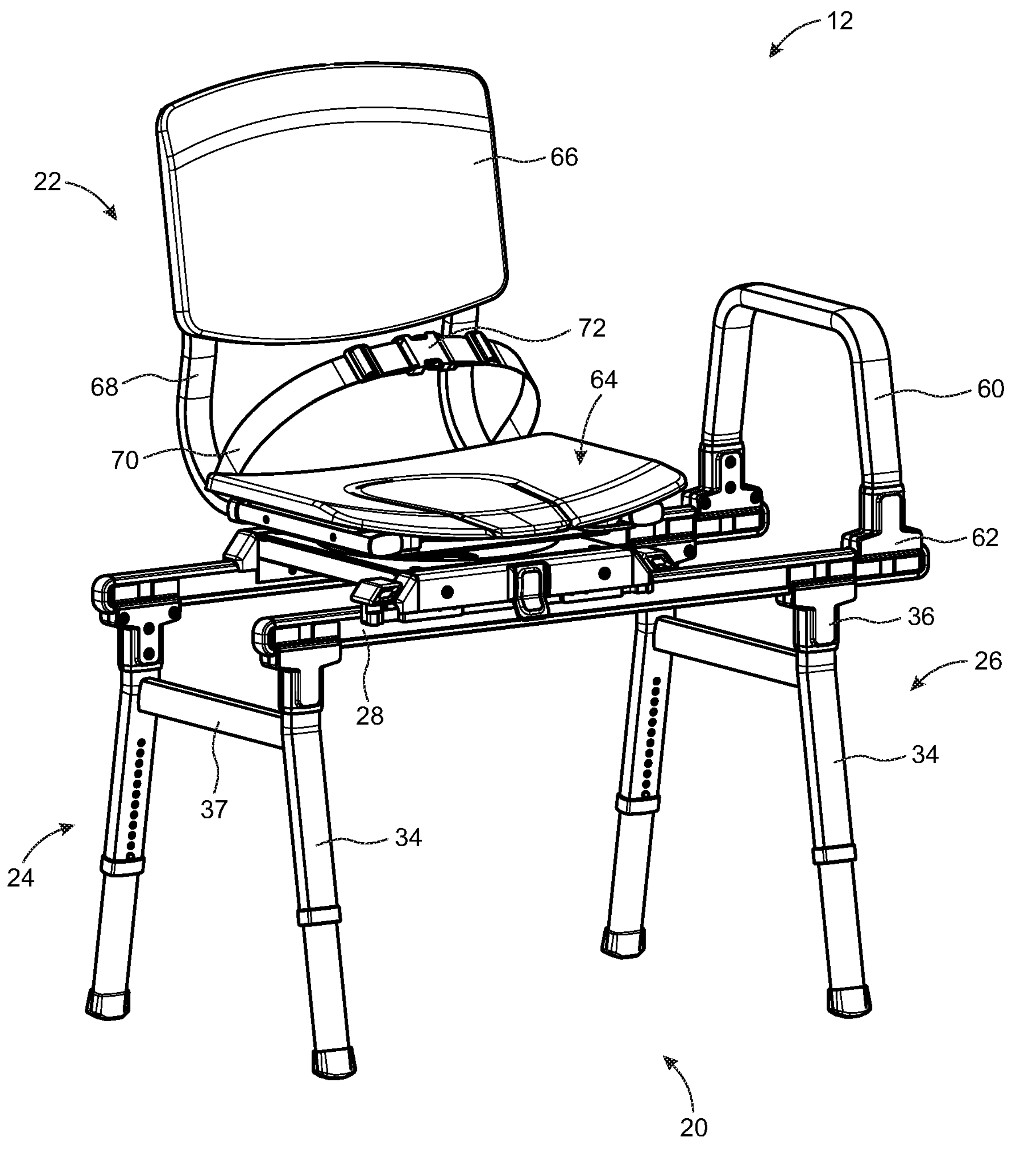
FIGS. 2A and 2B illustrate a front perspective view, and a partial rear perspective view of the bathtub chair, in accordance with one embodiment of the present invention.
Figure 2B:
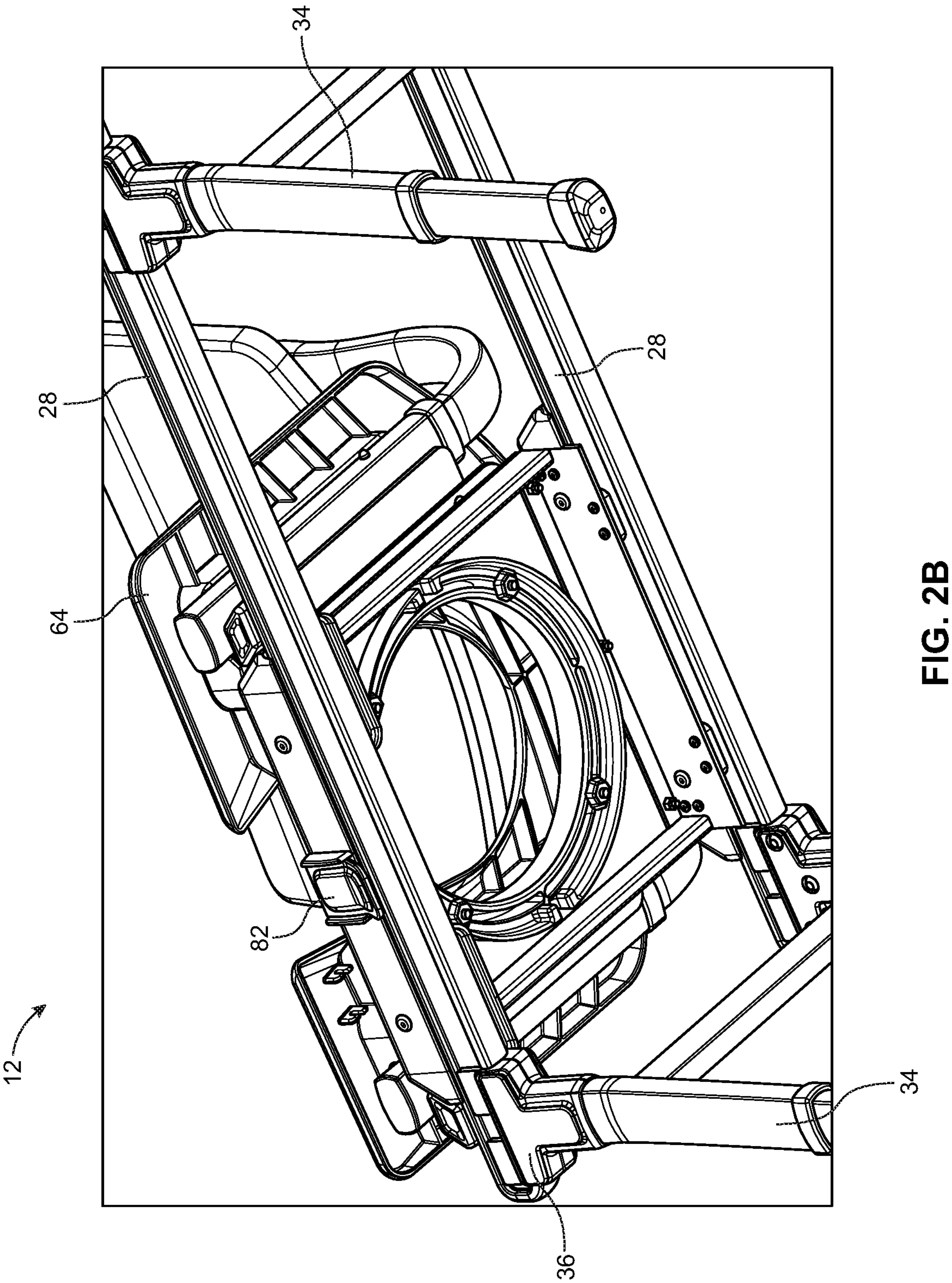
Figure 3:
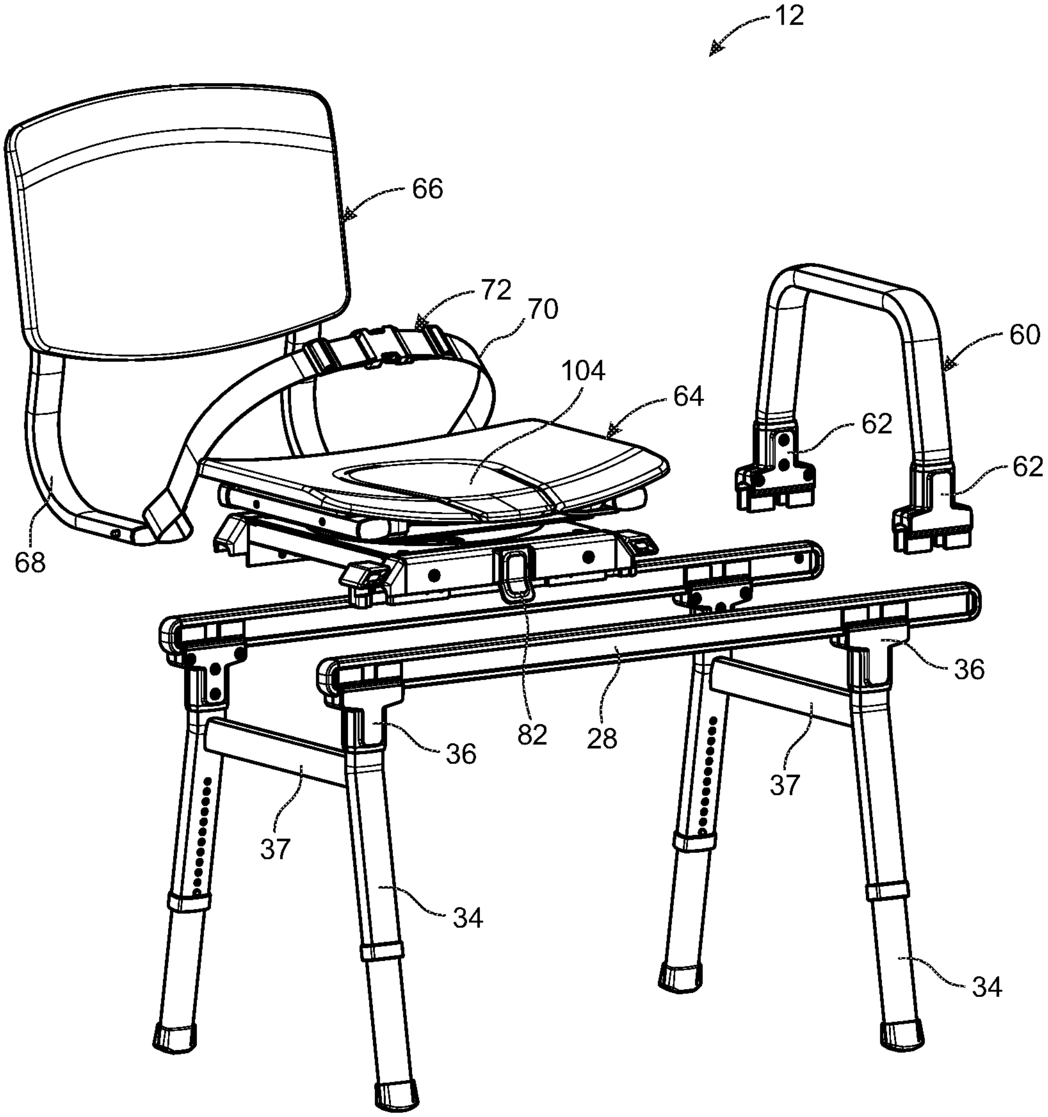
FIG. 3 illustrates an exploded view of the bathtub chair, in accordance with one embodiment of the present invention.

FIGS. 2A and 2B show a front perspective view and a partial rear perspective view, respectively of bathtub chair 12, in accordance with one embodiment of the present invention. Further, FIG. 3 shows an exploded view of bathtub chair 12, in accordance with one embodiment of the present invention. Bathtub chair 12 includes a front side 20, a rear side 22, a first end 24 and a second end 26. Front side 20 indicates a front end of bathtub chair 12. Rear side 22 indicates a back side or rear end of bathtub chair 12. First end 24 indicates a right side of bathtub chair 12 and second end 26 indicates a left side of bathtub chair 12, or vice versa.

Figure 4:
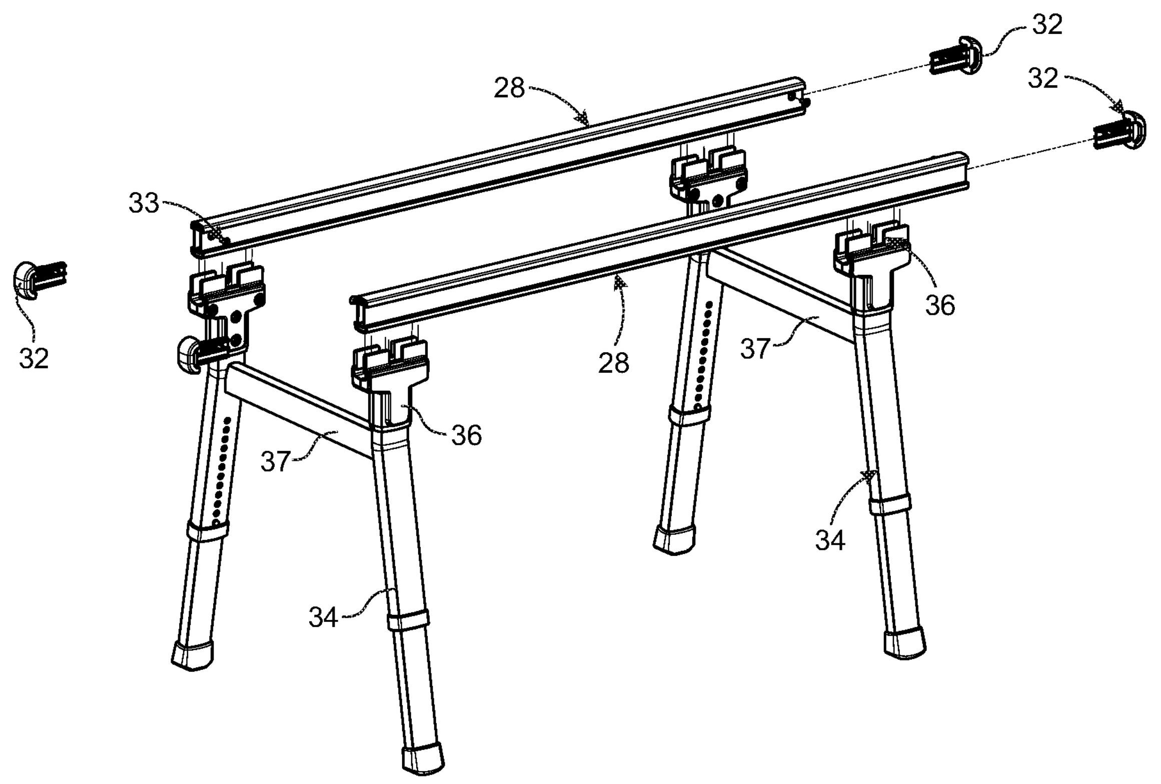
FIG. 4 illustrates rail frames having end caps, in accordance with one embodiment of the present invention.
Figure 5:
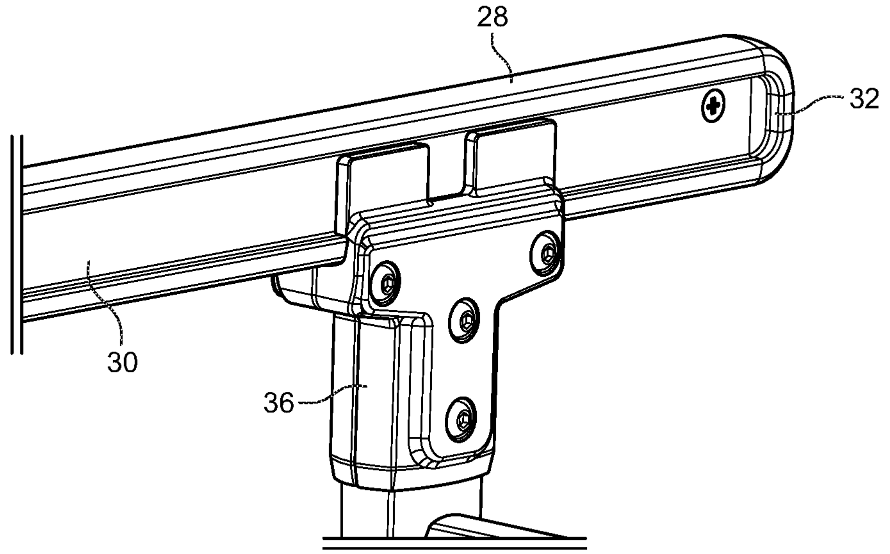
FIG. 5 illustrates the rail frame having spacing and connecting a leg frame, in accordance with one embodiment of the present invention.

Bathtub chair 12 includes a pair of rail frames 28. FIGS. 2A, 3 and 4 show the feature of rail frames 28. Rail frames 28 are made of metal, hard plastic, wood, or any other suitable material. As can be seen from FIG. 2A, one rail frame 28 positions at front side 20 and another rail frame 28 positions at rear side 22. Each rail frame 28 comes in an elongated and substantial rectangular configuration. Each rail frame 28 includes a leg and handle receiving section 30. FIG. 5 shows the feature of leg and handle receiving section 30. As can be seen, leg and handle receiving section 30 is a cut-section extending over the entire length of rail frame 28. The receiving section is shaped such that its central long axis region is recessed compared to the top and bottom of the rail frame 28. This feature prevents the seat assembly 64 from being able to be lifted off of the rail frames 28, that is, even if the entire device were turned upside down, the seat assembly 64 that is slidably connected to the rail frames would not separate from the rail frames 28. Leg and handle receiving section 30 provides a spacing for connecting first connecting member 36 of leg frame 34 and handlebar 60 to rail frame 28. Further, each rail frame 28 includes a fastener 33 at distal ends of first end 24 and second end 26. Fasteners 33 help to connect end caps 32 at distal ends of each rail frame 28. FIG. 4 shows the feature of end caps 32 aligning with the distal ends of each rail frame 28. Further, FIGS. 2A, 3 and 5 show the feature of end caps 32 connected at the distal ends of rail frame 28. The end caps 32 prevent the seat assembly 64 from falling off of the rails 28 in the horizontal direction, even if the device is tipped. The combination of the end caps 32 and recessed receiving section 30 of the rails 28 provide a secure attachment of the seat assembly 64 in both the horizontal and vertical direction, while still allowing the seat assembly 64 to slide along the rails.

Rail frames 28 connect to a pair of leg frames 34 via first connecting members 36, as shown in at least FIGS. 4 and 5. Each leg frame 34 comes in the shape of a letter "H". Optionally, each leg frame 34 comes in the shape of a letter "Y" or any other configuration without departing from the scope of the present invention. As can be seen from at least FIGS. 2A, 3, and 4, leg frames 34 position at first end 24 and second end 26 and support rail frames 28 at a height from a surface such as the ground/floor. Leg frames 34 are spaced apart at a suitable distance based on the shape and size of bathtub 14 and/or toilet 16, or based on the need of user 18. FIG. 1 shows leg frames 34 positioned at suitable height have sufficient clearance for user 18 to slide along rails frames 28. Each leg frame 34 includes a support rod 37 for distributing the weight of bathtub chair 12 and/or user 18.

Figure 6:
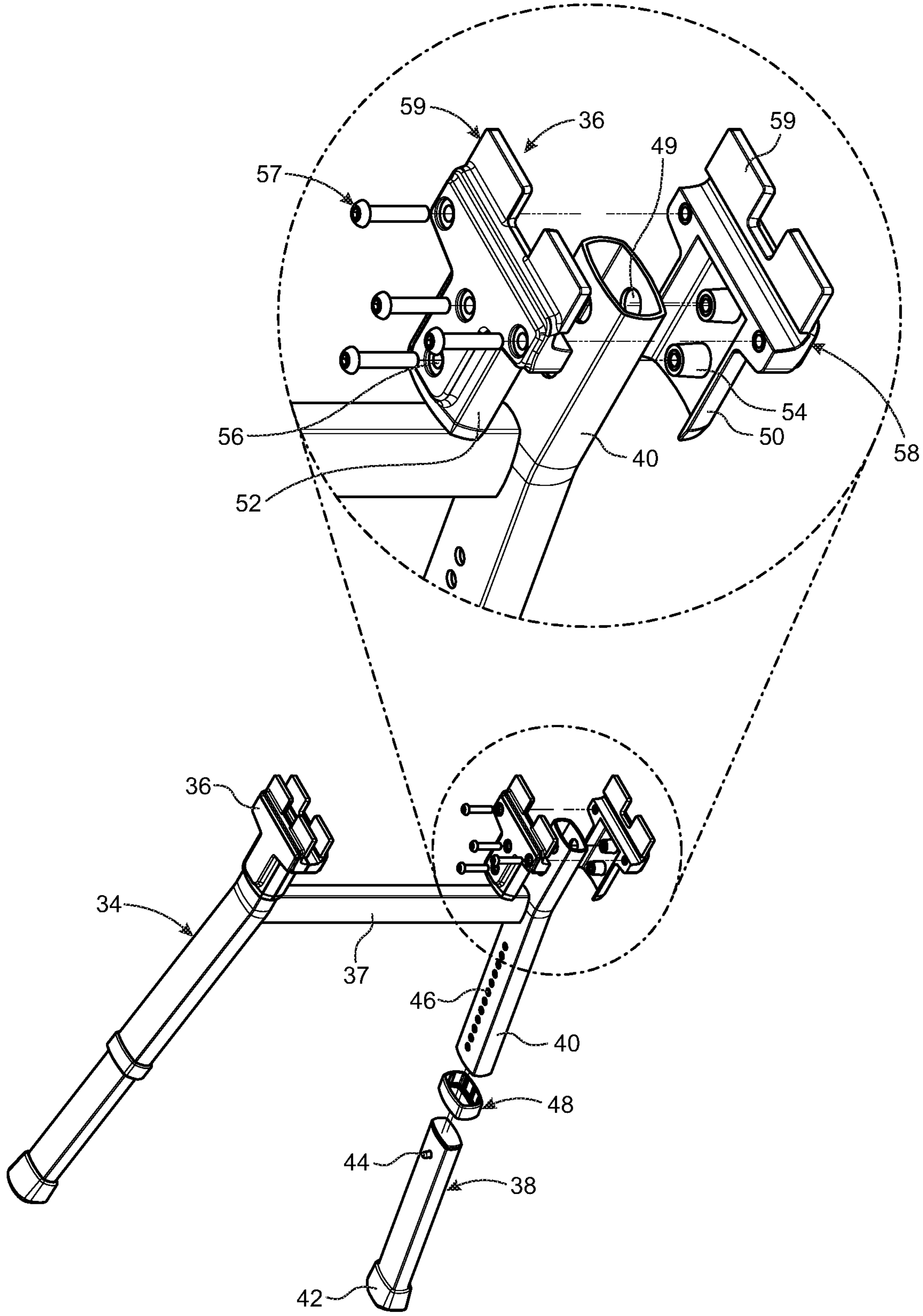
FIG. 6 illustrates an exploded view of the leg frame, in accordance with one embodiment of the present invention.

Referring to FIG. 6, each leg frame 34 includes a first leg part 38 and a second leg part 40. First leg part 38 positions at the bottom and second leg part 40 positions over first leg part 38. First leg part 38 includes a pad or cap 42 for preventing leg frame 34 from damaging the floor. First leg part 38 includes a pin 44. Pin 44 extends from the surface of first leg part 38. Pin 44 is retractable and helps to lock the position of second leg part 40 over first leg part 38 and adjust the height of leg frame 34. Second leg part 40 encompasses a plurality of holes 46. Further, second leg part 40 encompasses a sleeve 48. Sleeve 48 connects at the bottom of second leg part 40 and prevents the bottom edges of second leg part 40 from getting exposed and prevents injuries to user 18. In use, user 18 adjusts the height of leg frame 34 by positioning second leg part 40 over first leg part 38 and inserting pin 44 in any one of plurality of holes 46. Further, second leg part 40 encompasses top holes 49 for receiving first connecting member 36 in order to connect to rail frame 28.

FIG. 6 shows an exploded view of first connecting member 36, in accordance with one embodiment of the present invention. As can be seen, first connecting member 36 includes a first T-shaped member 50 and a second T-shaped member 52. First T-shaped member 50 indicates a male T-shaped member 50 and second T-shaped member 52 indicates a female T-shaped member 52. First T-shaped member 50 includes male members 54 extending from the inner surface of first T-shaped member 50. Second T-shaped member 52 includes female members 56 aligned with male members 54. A person skilled in the art understands that female members 56 indicates holes at second T-shaped member 52 aligned with male members 54. Further, first connecting member 36 includes fasteners 57. Furthermore, each of first T-shaped member 50 and second T-shaped member 52 includes over molded inserts 58 having a plurality of connecting pads/stop blocks 59 extending therefrom. Connecting pads 59 are formed to fit into leg and handle receiving section 30 provided at rail frame 28. In operation, male members 54 are drawn through top holes 49 of second leg part 40 and female members 56, and fasteners 57 are connected to mount first T-shaped member 50 and second T-shaped member 52 from each side of second leg part 40 while positioning connecting pads 59 at leg and handle receiving section 30, as shown in at least FIGS. 5 and 6. This ensures leg frame 34 is connected to rail frame 28 via first connecting member 36. One of leg frames 34 is connected at a distance from distal end of rail frame 28 to connect a second connecting member 62 holding handlebar 60, as shown in FIG. 5.

FIGS. 2A and 3 shows the feature of handlebar or grab bar 60, in accordance with one exemplary embodiment of the present invention. Handlebar 60 comes in the shape of the letter "U". In other words, handlebar 60 comes in a U-shaped configuration. Optionally, handlebar 60 comes in different shapes such as triangular shape, for example. Handlebar 60 supports user 18 while sliding first end 24 to second end, or vice versa. Handlebar 60 includes second connecting members 62 at its distal ends. Each of second connecting members 62 includes all components and operates similarly to first connecting member 36. Second connecting members 62 connect to rail members 28 at the distal end of second end 26. As specified above, one of leg frames 34 is connected at a distance with a gap from distal end of rail frame 28 to connect second connecting member 62 holding handlebar 60, as shown in FIG. 5. Second connecting members 62 connect at the gap between the distal end of rail frame 28 and first connecting member 36/leg frame 34, as shown in FIG. 4. Although it is shown that handlebar 60 is connected at second end 26, it is obvious to a person skilled in the art to provide handlebar 60 at either of first end 24 or second end 26, or at both first end 24 and second end 26, without departing from the scope of the present invention.

Further, bathtub chair 12 includes a seat assembly 64 mounted over rail frames 28. Bathtub chair 12 includes a backrest 66 connected to seat assembly 64 via a support member 68. In one exemplary embodiment, support member 68 includes a seatbelt 70 having a buckle 72. User 18 straps seatbelt 70 around his body and tightens seatbelt 70 with the help of buckle 72, as shown in FIG. 1, for example. Seatbelt 70 ensures user 18 is firmly connected to bathtub chair 12 and does not fall off bathtub chair 12 when moving from first end 24 to second end 26, or vice versa, or while turning around.

Figure 7:
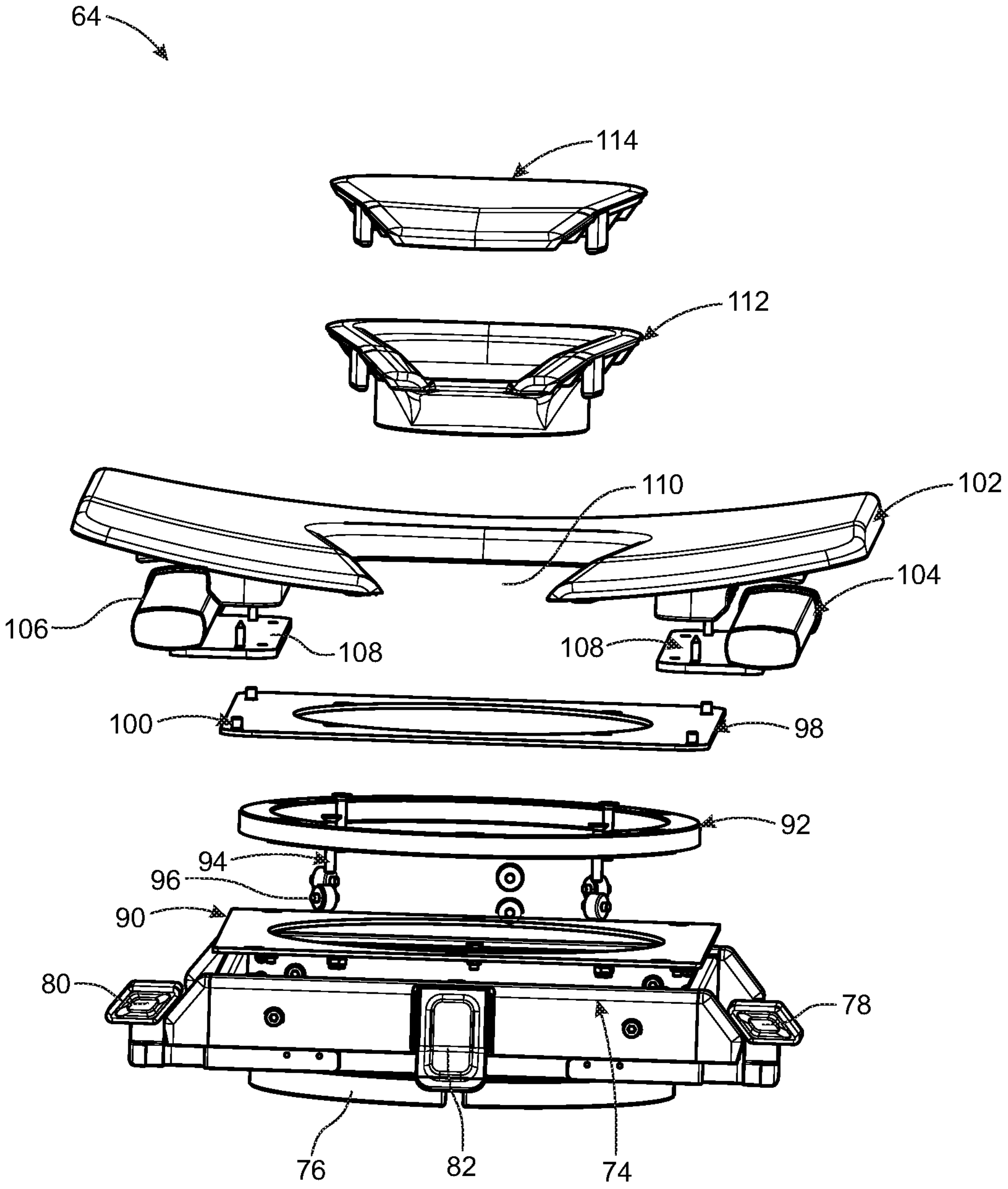
FIG. 7 illustrates an exploded view of a seat assembly, in accordance with one embodiment of the present invention.
Figure 9:
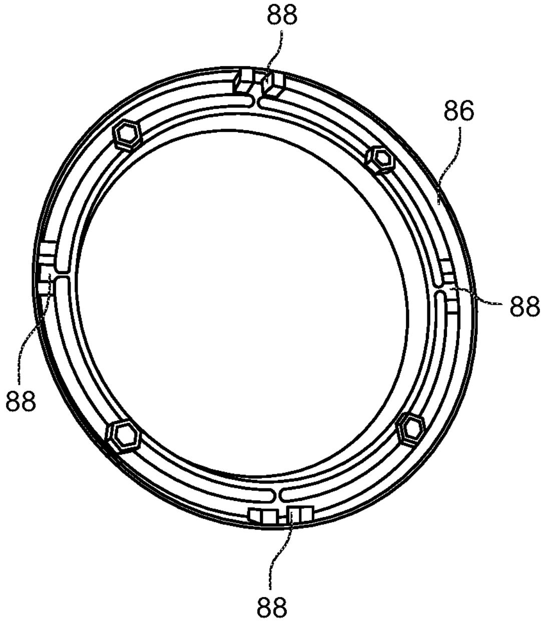

FIG. 7 shows an exploded view of seat assembly 64, in accordance with one exemplary embodiment of the present invention. Seat assembly 64 includes a carriage assembly 74 having a carriage trim 76. Carriage assembly 74 includes a first latch or first side latch 78, a second latch or second side latch 80 and a lever 82. First latch 78 indicates a latch on second end 26 and second latch indicates a latch on first end 24. Each of first latch 78 and second latch 80 help to position and lock carriage assembly 74 with respect to first connecting member 36. Further, lever 82 helps to lock the rotation of seat 102 allowing user 18 to turn/rotate and lock position while being seated on seat 102. Lever 82 includes a latch pin 84 that gets locked to a latch plate 86 having latch holes 88 positioned within carriage assembly 74. FIG. 9 shows a bottom perspective of latch plate 86 having latch holes 88 for receiving pin 84 in order to lock the position of seat 102 with respect to carriage assembly 74.

Figure 8:
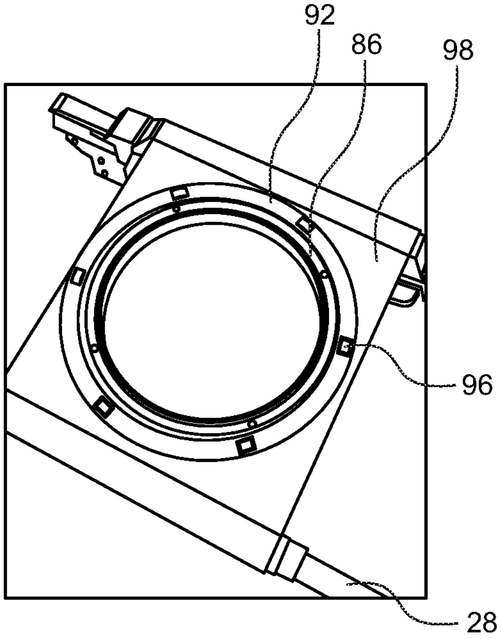
FIG. 8 and FIG. 9 illustrate the feature of a latch plate, in accordance with one embodiment of the present invention.

Further, seat assembly 64 includes a first swivel plate 90. This swivel plate 90 allows seat and seat assembly 64 to swivel (i.e., the seat is adapted to, designed to, configured to, and allows the seat to be capable of swivelling and rotating relative to rail frames 28 in all embodiments throughout the specification). First swivel plate 90 indicates a lower swivel plate. First swivel plate 90 comes in a substantial square or rectangular configuration. First swivel plate 90 includes spacing therebetween. First swivel plate 90 positions over carriage assembly 74. Seat assembly 64 further includes a roller support ring 92. Roller support ring 92 positions at first swivel plate 90 and comes in a circular configuration. Roller support ring 92 encompasses support rods 94 connecting swivel rollers 96. FIG. 8 shows the feature of roller support ring 92 positioned within plate 86, in accordance with one embodiment of the present invention. Further, seat assembly 64 includes a second swivel plate 98 placed over first swivel plate 90. Second swivel plate 98 indicates a top swivel plate 98. Second swivel plate 98 connects to first swivel plate 90 with the help of fasteners 100.

Figure 10:
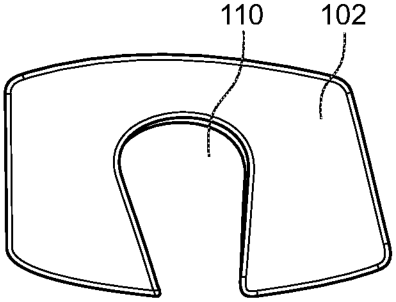
FIG. 10, FIG. 11, FIG. 12 and FIG. 13 illustrate various features of a seat, in accordance with one embodiment of the present invention.
Figure 11:
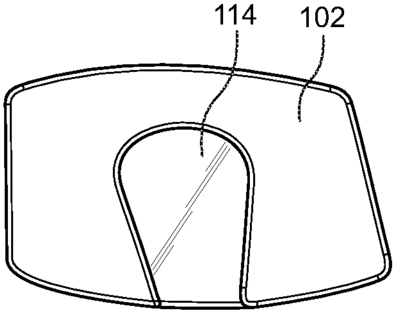
Figure 12:
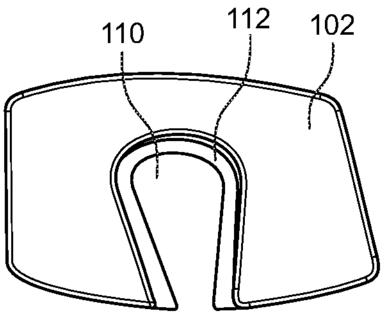
Figure 13:
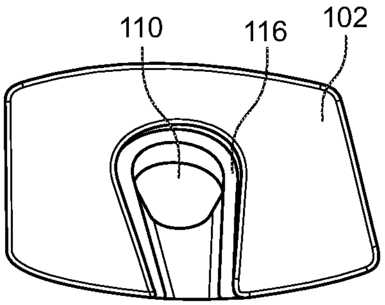

Seat assembly 64 further comprises a seat 102. User 18 sits on seat 102 and moves/slides along rail frame 28 or rotates with the help of seat assembly 64. Seat 64 includes a first carriage cap 104 and a second carriage cap 106. First carriage cap 104 positions over first latch 78, and second carriage cap 106 positions over second latch 80. Each of first carriage cap 104 and second carriage cap 106 connect to second swivel plate 98 with the help of connecting plates 108. User 18 operates first carriage cap 104 and second carriage cap 106 to engage first latch 78 and/or second latch 80 to move along and position seat assembly 64 at leg frames 34. Seat 102 is designed for providing comfort for user 18 to be seated for a long period of time. Seat 102 encompasses a seat opening 110 allowing user 18 to use over toilet 16 while being seated over seat 102. FIG. 10 shows a top view of seat 102 having seat opening 110. In one example, seat 102 includes a seat insert 114. Seat insert 114 comes in the shape of seat opening 110 and fits inside seat opening 110 thereby closing seat opening 110 and providing complete seat 102. FIG. 11 shows the feature of seat insert 114 placed in seat 102, in accordance with one exemplary embodiment of the present invention. Additionally, seat 102 includes a reducer ring 112. Reducer ring 112 inserts at seat opening 110 for reducing the space or opening at seat opening 110. Further, seat 102 includes a splatter guard 116 to prevent water from splashing outside of toilet 16.

Figure 14:
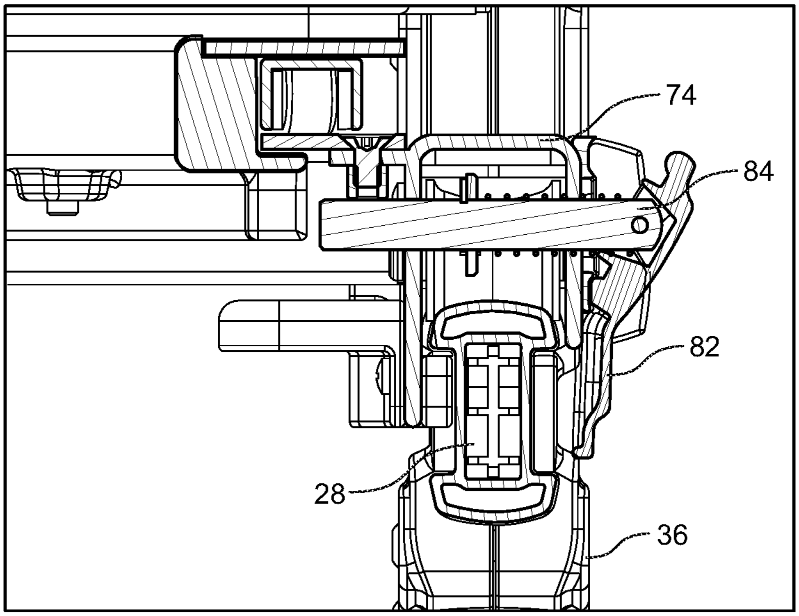
FIG. 14 and FIG. 15 illustrate cross-sectional views of a centre latch and a pin, in accordance with one embodiment of the present invention.
Figure 15:
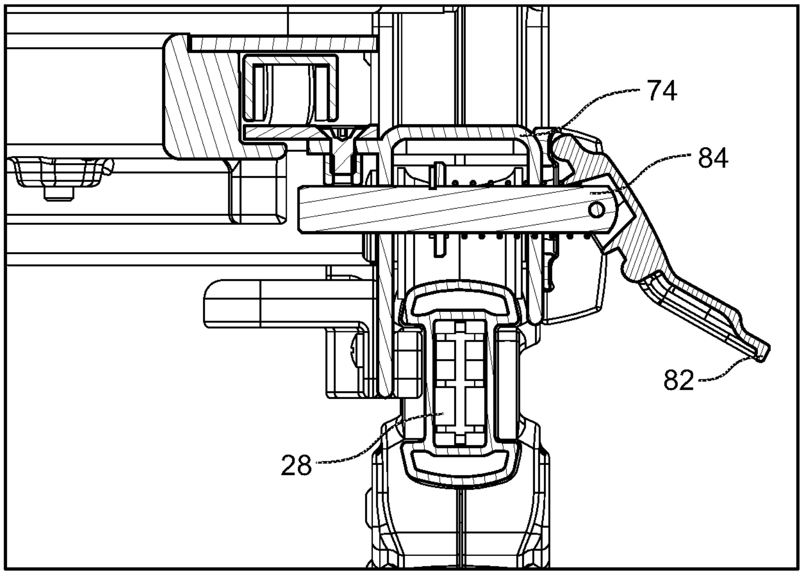
Figure 18:
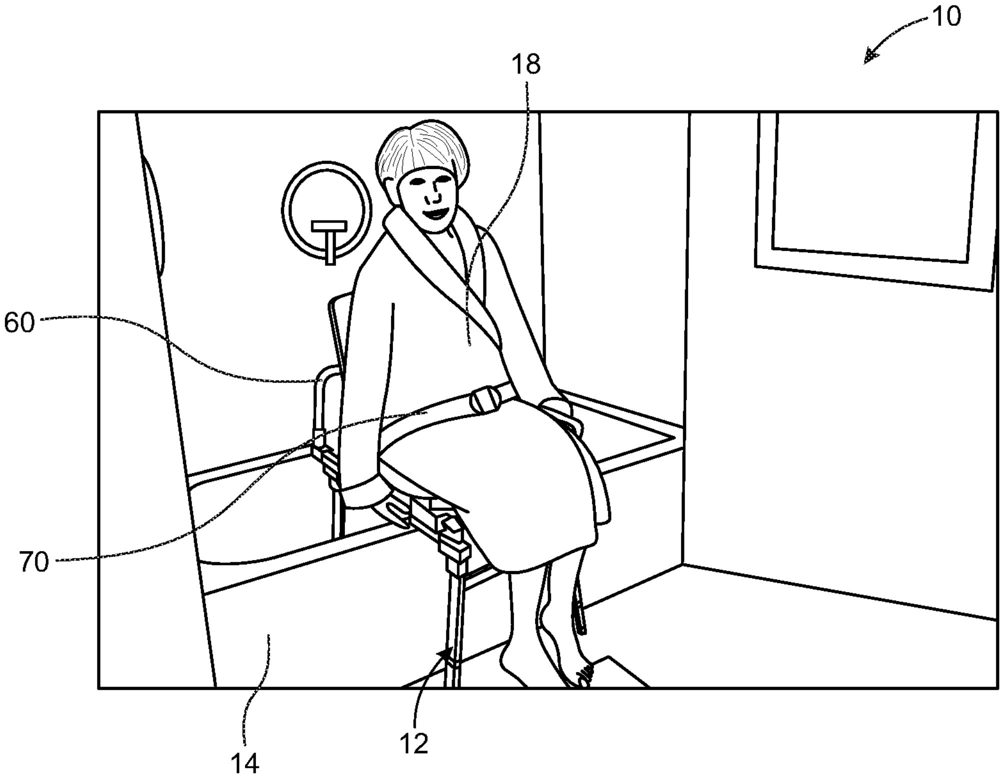
FIG. 18 and FIG. 19 illustrate operational features of the bathtub chair, in accordance with one embodiment of the present invention.

Referring to FIGS. 1, 9, and 14-19, swivel and lock operations of seat assembly 64 are explained. FIG. 14 shows the feature of lever 82 in an engaged position. Here, lever 82 is pressed/closed such that pin 84 inserts in one of latch holes 88 (as shown in FIG. 9). Lever 82 enters into one of latch holes 88 and locks the position of seat assembly 64 whereby backrest 66 faces front side 20, as shown in FIG. 1, for example. When needed, lever 82 is disengaged which in turn pulls pin 84 away from latch plate 86, as shown in FIG. 15. Pulling pin 84 away allows swivel plate 86 and roller support ring 92 to swivel in a clock or clockwise direction. Consider that user 18 wishes to turn towards second end 26. Here, user 18 exerts pressure to turn left towards second end 26, as shown in FIG. 18, for example. After reaching the desired turn/rotation while being seated over seat 102, user engages lever 82 such that pin 84 enters one of latch holes 88 and locks the position of seat assembly 64 (FIG. 18). A person skilled in the art understands that user 18 can exert force o swivel around at any position over the length of rail frames 28. This is made possible by the swivel mechanism of swivel plate 86 and roller support ring 92.

Figure 16:
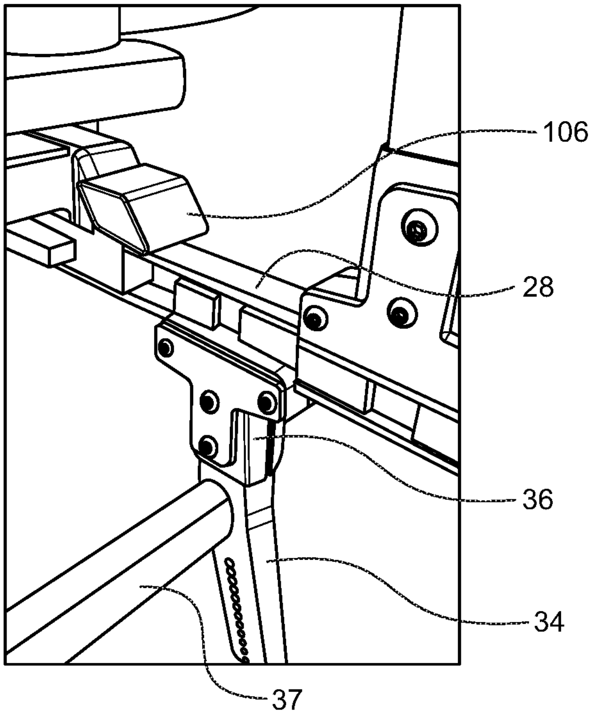
FIG. 16 and FIG. 17 illustrate connecting the seat assembly to the leg frame via a first connecting member, in accordance with one embodiment of the present invention.
Figure 17:
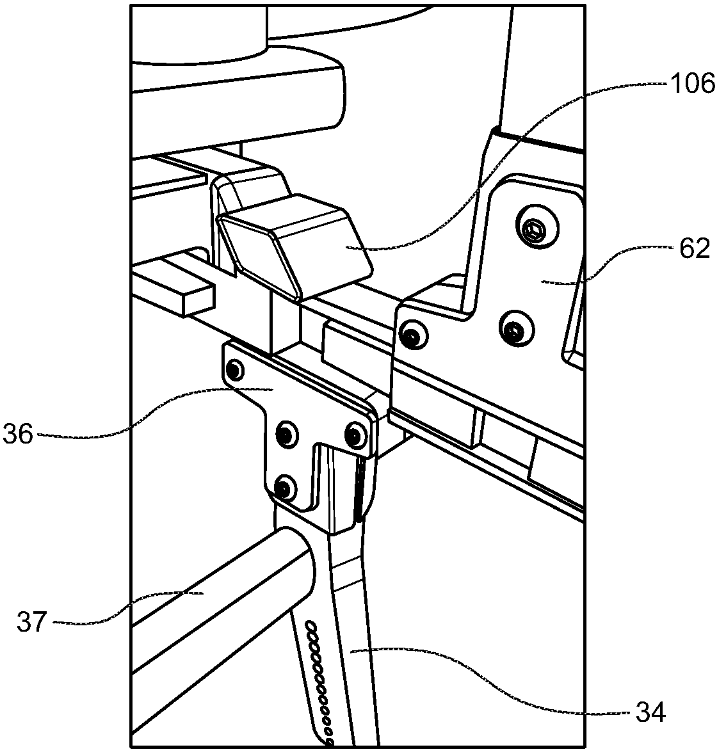
Figure 19:
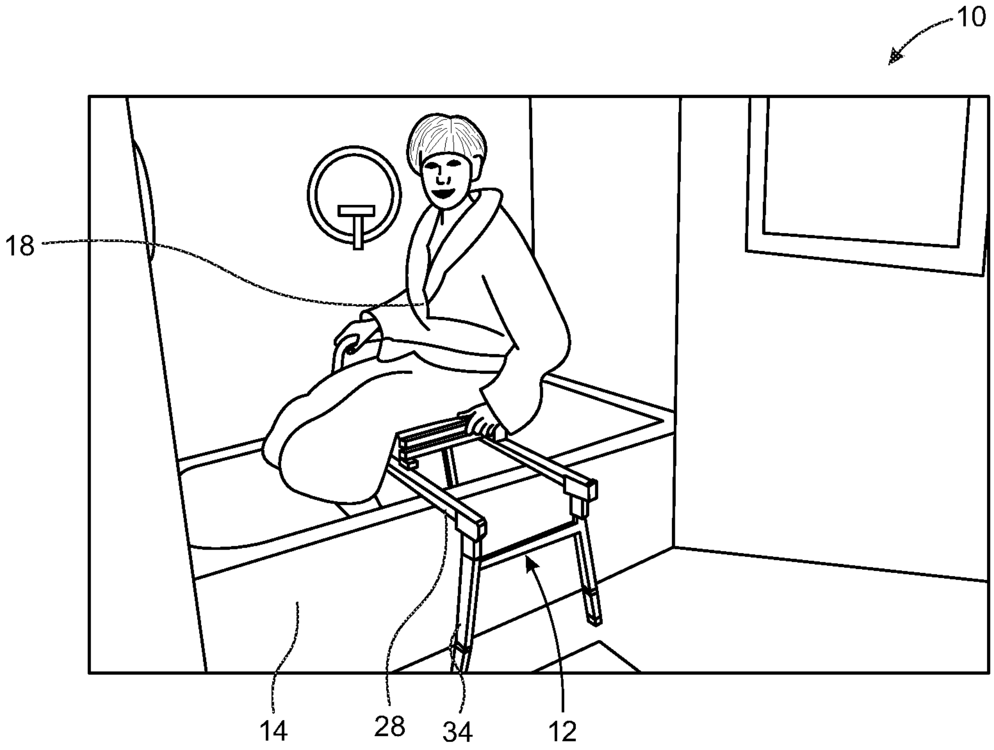

Further, user 18 slides across rail frames 28 from one first end 24 to second end 26, or vice versa. Consider, user 18 is seated over seat assembly 64 at second end 26, as shown in FIG. 1, for example. When user 18 wishes to slide or move from second end 26 to first end 24, then user 18 disengages first latch 78 via first carriage cap 104 and slides along rail frames 28 towards first end 24. FIG. 16 shows the feature of seat assembly 64 approaching leg frame 34 at first end 24. Here, second latch 80 comes in proximity to leg frame 34. As user 18 slides, the sliding force pushes second latch 80 and second carriage cap 106 over connecting pad 59 of first connecting member 36 at leg frame 34 and locks the position of seat assembly 64 at first end 24, as shown in FIG. 19, for example.

Figure 20:
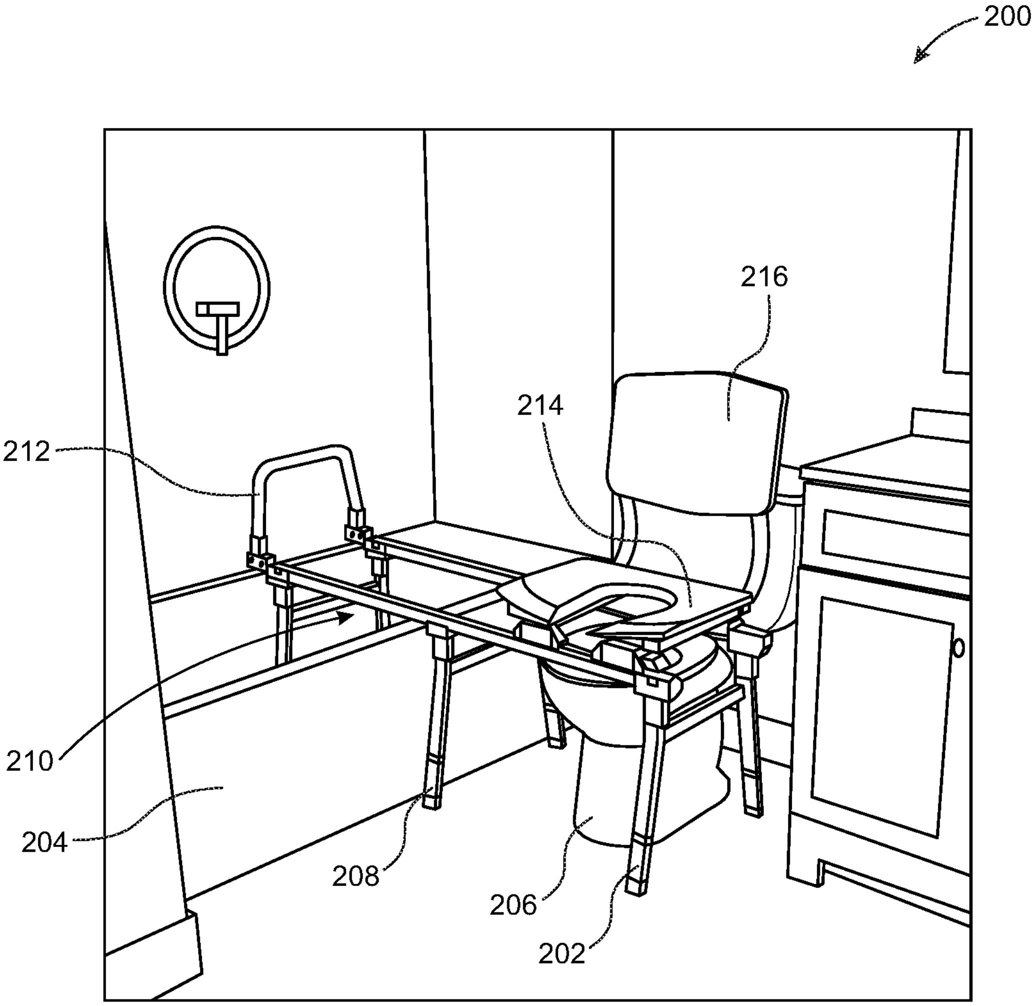
FIG. 20 illustrates an environment in which a bathtub chair implements, in accordance with another embodiment of the present invention.

FIG. 20 shows an environment 200 of which a bathtub chair 202 implements, in accordance with another exemplary embodiment of the present invention. In the present embodiment, bathtub chair 202 presents use in a bathtub 204 and/or toilet 206. Here, bathtub chair 202 includes three leg frames 208 instead of two as presented in the above embodiments. Leg frames 208 support rail frames 210, similar to rail frames 28 explained above. Rail frames 210 includes a handlebar 212 at end. Further, bathtub chair 202 includes a seat assembly 214 and a backrest 216 similar to seat assembly 64 and backrest 66, explained above. Bathtub chair 202 includes all the components and operates similarly to bathtub chair 12 explained above.

The embodiments provide for several advantages over the prior art. For example, the presently disclosed bathtub chair includes a swivel seat. The swivel seat can go over the toilet and then slide across into a bathtub over rails. The user can orient him or herself with respect to the tub in any direction because the swivel seat can swivel. The swivel seat has a seat opening that allows the swivel seat to be used as a commode seat. The bathtub chair includes height adjustable legs. The legs are adjusted up or down by locking pins.

The presently disclosed bathtub chair can be used as a sliding transfer bench. The bathtub chair fits in environments where there are no obstructions adjacent to the bathtub. The bathtub chair slides easily over the bathtub and locks in two points; on the inside and outside of the bathtub. The bathtub chair can be installed as a left or right-hand unit. The handlebar helps the user to grab and slide from one end to another. The user can pull or push himself or herself easily along the rails. Further, the height of the bathtub chair can be adjusted easily thereby allowing tit to be used easily over the bathtub.

Further, the seat comes as an open commode seat for easy washing. Furthermore, the seat includes a reducer ring to reduce the size of the commode opening. Additionally, the seat includes a solid seat insert to close the commode opening completely.

Clause 1. A bathtub chair, comprising: rail frames; leg frames comprising first connecting members, wherein the first connecting members connect the rail frames; and a seat assembly connected to the rail frames, wherein the seat assembly comprises a seat, wherein the seat is capable of receiving a user, wherein the seat is designed to swivel, and wherein the seat assembly is designed to slide along the rail frames.

Clause 2. The bathtub chair of Clause 1, wherein the seat assembly comprises a swivel plate, and wherein the swivel plate comprises latch holes.

Clause 3. The bathtub chair of Clause 2, wherein the seat assembly comprises a roller support ring having swivel rollers, and wherein the swivel rollers rotate and allow the swivel plate to swivel along with the seat.

Clause 4. The bathtub chair of Clause 3, wherein the seat assembly comprises a latch pin, and wherein the latch pin enters one of the latch holes and locks rotation of the seat.

Clause 5. The bathtub chair of Clause 4, further comprises a lever, wherein the lever connects and engages the latch pin to enter or pull out from one of the latch holes.

Clause 6. The bathtub chair of Clause 1, further comprises a backrest, wherein the backrest connects to the seat assembly via a support member.

Clause 7. The bathtub chair of Clause 6, wherein the support member comprises a seatbelt, and wherein the seatbelt straps around the user seated on the seat.

Clause 8. The bathtub chair of Clause 1, wherein the seat comprises a seat opening allowing the user to use a toilet while being seated over the seat.

Clause 9. The bathtub chair of Clause 1, wherein each of the leg frames comprises a first leg part and a second leg part, wherein the first leg part comprises a pin, wherein the second leg part comprises a plurality of holes, and wherein the pin enters one of the plurality of holes and helps to adjust a height of a leg frame of the leg frames.

Clause 10. The bathtub chair of Clause 1, wherein each of the first connecting members comprises a first T-shaped member and a second T-shaped member, wherein each of the first T-shaped member and the second T-shaped member comprises a plurality of connecting pads, and wherein the plurality of connecting pads connect around a rail frame of the rail frames to connect the leg frame with the rail frame.

Clause 11. The bathtub chair of Clause 10, wherein the rail frame comprises a leg and handle receiving section extending along substantially an entire length of the rail frame, and wherein the plurality of connecting pads insert in the leg and handle receiving section.

Clause 12. The bathtub chair of Clause 1, further comprises a handlebar, wherein the handlebar comprises a second connecting member having a plurality of connecting pads, wherein the plurality of connecting pads connect around a rail frame of the rail frames, and wherein the handlebar mounts to the rail frames in between a leg frame of the leg frames and one distal end of the rail frames.

Clause 13. The bathtub chair of Clause 10, further comprises side latches, wherein one of the side latches connects to a connecting pad of the plurality of connecting pads when the seat assembly slides and connects the first connecting member.

Clause 14. A bathtub chair, comprising: rail frames, wherein each rail frame comprises a leg and a handle receiving section extending along substantially an entire length of the rail frame; leg frames comprise a first leg part and a second leg part, wherein the first leg part comprises a pin, wherein the second leg part comprises a plurality of holes, and wherein the pin enters one of the plurality of holes and helps to adjust a height of the leg frames; first connecting members connected to the leg frames, wherein each of the first connecting members comprises a first T-shaped member and a second T-shaped member, wherein each of the first T-shaped member and the second T-shaped member comprises a plurality of connecting pads, and wherein the plurality of connecting pads insert in the leg and handle receiving section and connect to a rail frame of the rail frames; and a seat assembly connected to the rail frames, wherein the seat assembly comprises a seat, wherein the seat is capable of receiving a user, wherein the seat is designed to swivel, and wherein the seat assembly is designed to slide along the rail frames.

Clause 15. The bathtub chair of Clause 14, wherein the seat assembly comprises a swivel plate, and wherein the swivel plate comprises latch holes.

Clause 16. The bathtub chair of Clause 15, wherein the seat assembly comprises a roller support ring having swivel rollers, wherein the swivel rollers rotate and allow the swivel plate to swivel along with the seat, wherein the seat assembly comprises a latch pin, and wherein the latch pin enters one of the latch holes and locks rotation of the seat, wherein the seat assembly comprises a lever, and wherein the lever connects and engages the latch pin to enter or pull out from one of the latch holes.

Clause 17. The bathtub chair of Clause 14, further comprises side latches, wherein one of the side latches connects to a connecting pad of the plurality of connecting pads when the seat assembly slides towards a leg frame of the leg frames.

Clause 18. A bathtub chair, comprising: rail frames, wherein each rail frame comprises a leg and a handle receiving section extending along substantially an entire length of the rail frames; leg frames comprise a first leg part and a second leg part, wherein the first leg part comprises a pin, wherein the second leg part comprises a plurality of holes, and wherein the pin enters one of the plurality of holes and helps to adjust a height of the leg frames; first connecting members connected to the leg frames, wherein each of the first connecting members comprises a first T-shaped member and a second T-shaped member, wherein each of the first T-shaped member and the second T-shaped member comprises a plurality of connecting pads, and wherein the plurality of connecting pads insert in the leg and handle receiving section and connect to a rail frame of the rail frames; a seat assembly connected to the rail frames, the seat assembly comprises a roller support ring having swivel rollers, a swivel plate having latch holes, and a latch pin; and, a seat positioned over the swivel plate, wherein the swivel rollers rotate and allow the swivel plate to swivel along with the seat, wherein the seat receives a user and is design to swivel, wherein the latch pin enters one of the latch holes and locks the rotation of the seat, and wherein the seat assembly is designed to slide along the rail frames.

Clause 19. The bathtub chair of Clause 18, further comprises a handlebar, wherein the handlebar comprises a second connecting member having a plurality of connecting pads, wherein the plurality of connecting pads connect around a rail frame of the rail frames, and wherein the handlebar mounts to the rail frames in between a leg frame of the leg frames and one distal end of the rail frames.

Clause 20. The bathtub chair of Clause 18, further comprises side latches, wherein one of the side latches connects to a connecting pad of the plurality of connecting pads when the seat assembly slides and connects the first connecting member.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A bathtub chair, comprising:

rail frames;

leg frames comprising first connecting members, wherein the first connecting members connect the rail frames; and a seat assembly connected to the rail frames, wherein the seat assembly comprises a seat, wherein the seat is capable of receiving a user, wherein the seat is designed to swivel, and wherein the seat assembly is designed to slide along the rail frames, wherein each of the first connecting members comprises a first T-shaped member and a second T-shaped member, wherein each of the first T-shaped member and the second T-shaped member comprises a plurality of connecting pads, and wherein the plurality of connecting pads connect around a rail frame of the rail frames to connect the leg frame with the rail frame.

2. The bathtub chair of claim 1, wherein the seat assembly comprises a swivel plate, and wherein the swivel plate comprises latch holes.

3. The bathtub chair of claim 2, wherein the seat assembly comprises a roller support ring having swivel rollers, and wherein the swivel rollers rotate and allow the swivel plate to swivel along with the seat.

4. The bathtub chair of claim 3, wherein the seat assembly comprises a latch pin, and wherein the latch pin enters one of the latch holes and locks rotation of the seat.

5. The bathtub chair of claim 4, further comprises a lever, wherein the lever connects and engages the latch pin to enter or pull out from one of the latch holes.

6. The bathtub chair of claim 1, further comprises a backrest, wherein the backrest connects to the seat assembly via a support member.

7. The bathtub chair of claim 6, wherein the support member comprises a seatbelt, and wherein the seatbelt straps around the user seated on the seat.

8. The bathtub chair of claim 1, wherein the seat comprises a seat opening allowing the user to use a toilet while being seated over the seat.

9. The bathtub chair of claim 1, wherein each of the leg frames comprises a first leg part and a second leg part, wherein the first leg part comprises a pin, wherein the second leg part comprises a plurality of holes, and wherein the pin enters one of the plurality of holes and helps to adjust a height of a leg frame of the leg frames.

10. The bathtub chair of claim 1, wherein the rail frame comprises a leg and handle receiving section extending along substantially an entire length of the rail frame, and wherein the plurality of connecting pads insert in the leg and handle receiving section.

11. The bathtub chair of claim 1, further comprises a handlebar, wherein the handlebar comprises a second connecting member having a plurality of connecting pads, wherein the plurality of connecting pads connect around a rail frame of the rail frames, and wherein the handlebar mounts to the rail frames in between a leg frame of the leg frames and one distal end of the rail frames.

12. The bathtub chair of claim 1, further comprises side latches, wherein one of the side latches connects to a connecting pad of the plurality of connecting pads when the seat assembly slides and connects the first connecting member.

13. A bathtub chair, comprising:

rail frames, wherein each rail frame comprises a leg and a handle receiving section extending along substantially an entire length of the rail frame;

leg frames comprise a first leg part and a second leg part, wherein the first leg part comprises a pin, wherein the second leg part comprises a plurality of holes, and wherein the pin enters one of the plurality of holes and helps to adjust a height of the leg frames;

first connecting members connected to the leg frames, wherein each of the first connecting members comprises a first T-shaped member and a second T-shaped member, wherein each of the first T-shaped member and the second T-shaped member comprises a plurality of connecting pads, and wherein the plurality of connecting pads insert in the leg and handle receiving section and connect to a rail frame of the rail frames; and a seat assembly connected to the rail frames, wherein the seat assembly comprises a seat, wherein the seat is capable of receiving a user, wherein the seat is designed to swivel, and wherein the seat assembly is designed to slide along the rail frames.

14. The bathtub chair of claim 13, wherein the seat assembly comprises a swivel plate, and wherein the swivel plate comprises latch holes.

15. The bathtub chair of claim 14, wherein the seat assembly comprises a roller support ring having swivel rollers, wherein the swivel rollers rotate and allow the swivel plate to swivel along with the seat, wherein the seat assembly comprises a latch pin, and wherein the latch pin enters one of the latch holes and locks rotation of the seat, wherein the seat assembly comprises a lever, and wherein the lever connects and engages the latch pin to enter or pull out from one of the latch holes.

16. The bathtub chair of claim 13, further comprises side latches, wherein one of the side latches connects to a connecting pad of the plurality of connecting pads when the seat assembly slides towards a leg frame of the leg frames.

17. The bathtub chair of claim 13, wherein the seat assembly comprises a seat and a roller support ring having swivel rollers, a swivel plate having latch holes, and a latch pin; and, wherein the seat is positioned over the swivel plate, wherein the swivel rollers rotate and allow the swivel plate to swivel along with the seat, wherein the seat receives a user and is design to swivel, wherein the latch pin enters one of the latch holes and locks the rotation of the seat, and wherein the seat assembly is designed to slide along the rail frames.

18. The bathtub chair of claim 17, further comprises a handlebar, wherein the handlebar comprises a second connecting member having a plurality of connecting pads, wherein the plurality of connecting pads connect around a rail frame of the rail frames, and wherein the handlebar mounts to the rail frames in between a leg frame of the leg frames and one distal end of the rail frames.

19. The bathtub chair of claim 17, further comprises side latches, wherein one of the side latches connects to a connecting pad of the plurality of connecting pads when the seat assembly slides and connects the first connecting member.

20. A bathtub chair, comprising:

rail frames;

leg frames comprising first connecting members, wherein the first connecting members connect the rail frames;

a seat assembly connected to the rail frames, wherein the seat assembly comprises a seat; and a handlebar, wherein the handlebar comprises a second connecting member having a plurality of connecting pads;

wherein the plurality of connecting pads connect around a rail frame of the rail frames, and wherein the handlebar mounts to the rail frames in between a leg frame of the leg frames and one distal end of the rail frames;

wherein the seat is capable of receiving a user, wherein the seat is designed to swivel, and wherein the seat assembly is designed to slide along the rail frames.

* * * * *